(12) United States Patent
Sigurdson

(10) Patent No.: US 12,150,450 B2
(45) Date of Patent: Nov. 26, 2024

(54) BIOLOGICAL PESTICIDE FUNGUS EFFECTIVE AGAINST MULTIPLE DIFFERENT SPECIES OF INSECT

(71) Applicant: John Thomas Sigurdson, Kailua-Kona, HI (US)

(72) Inventor: John Thomas Sigurdson, Kailua-Kona, HI (US)

( * ) Notice: Subject to any disclaimer, the term of this patent is extended or adjusted under 35 U.S.C. 154(b) by 0 days.

(21) Appl. No.: 17/861,658

(22) Filed: Jul. 11, 2022

(65) Prior Publication Data

US 2023/0129692 A1    Apr. 27, 2023

Related U.S. Application Data

(63) Continuation of application No. PCT/US2021/053795, filed on Oct. 6, 2021.

(60) Provisional application No. 63/087,922, filed on Oct. 6, 2020.

(51) Int. Cl.
```
A01N 63/30     (2020.01)
A01N 63/00     (2020.01)
A01P 7/04      (2006.01)
```

(52) U.S. Cl.
CPC .......... *A01N 63/30* (2020.01); *A01N 63/00* (2013.01); *A01P 7/04* (2021.08)

(58) Field of Classification Search
CPC ...................................... A01N 63/30
See application file for complete search history.

(56) References Cited

U.S. PATENT DOCUMENTS

| | | | |
|---|---|---|---|
| 4,066,795 A | 1/1978 | Davé | |
| 8,709,399 B2 | 4/2014 | Vidal et al. | |
| 9,487,471 B1 * | 11/2016 | Coelho | ................... C07C 67/14 |
| 2004/0161440 A1 | 8/2004 | Stamets | |

FOREIGN PATENT DOCUMENTS

| | | | | |
|---|---|---|---|---|
| CN | 104073439 A | * | 10/2014 | |
| EP | 570089 A1 | * | 11/1993 | ............. A01N 35/06 |
| WO | 2014/117118 A1 | | 7/2014 | |
| WO | WO-2014185419 A1 | * | 11/2014 | ............... C12N 1/14 |
| WO | WO-2019165413 A1 | * | 8/2019 | ............. A01N 25/08 |

OTHER PUBLICATIONS

International Search Report for Application No. PCT/US21/53795 Feb. 1, 2022.

* cited by examiner

*Primary Examiner* — Gina C Justice
(74) *Attorney, Agent, or Firm* — Merchant & Gould P.C.

(57) ABSTRACT

Compositions and methods for insect control are provided. In one example, a method of producing a mycoinsecticide composition comprises: preparing a starter culture to grow a strain of *B. bassiana* fungus; freezing and storing the prepared starter culture to obtain a fungus mixture; treating the stored fungus mixture to obtain a fungus liquid containing the grown *B. bassiana* fungus; treating and/or formulating the fungus liquid to obtain the mycoinsecticide composition; and packaging the mycoinsecticide composition. The *B. bassiana* fungus is preferably of the strain JTDRL-RC5A-HSSE deposited under NRRL Number 67768.

19 Claims, 2 Drawing Sheets

Specification includes a Sequence Listing.

```
┌─────────────────────────────────────────────────────────────┐
│    Preparing a starter culture to grow a strain of          │─── 110
│                   B. bassiana fungus                        │
│   ┌─────────────────────────────────────────────────────┐   │
│   │  Mixing water and a cereal grain in a vessel (111)  │   │
│   └─────────────────────────────────────────────────────┘   │
│                            ▼                                │
│   ┌─────────────────────────────────────────────────────┐   │
│   │ Adding a strain of B. bassiana fungus and molasses  │   │
│   │   in the vessel to produce a fungus mixture (112)   │   │
│   └─────────────────────────────────────────────────────┘   │
│                            ▼                                │
│   ┌─────────────────────────────────────────────────────┐   │
│   │              Sealing the vessel (113)               │   │
│   └─────────────────────────────────────────────────────┘   │
│                            ▼                                │
│   ┌─────────────────────────────────────────────────────┐   │
│   │ Allowing the fungus mixture to grow in the vessel   │   │
│   │  at a first temperature for a first period of time  │   │
│   │                       (114)                         │   │
│   └─────────────────────────────────────────────────────┘   │
└─────────────────────────────────────────────────────────────┘
                             ▼
┌─────────────────────────────────────────────────────────────┐
│   Freezing and storing the prepared starter culture to      │─── 120
│                  obtain a fungus mixture                    │
└─────────────────────────────────────────────────────────────┘
                             ▼
┌─────────────────────────────────────────────────────────────┐
│   Treating the stored fungus mixture to obtain a fungus     │─── 130
│       liquid containing the grown B. bassiana fungus        │
│   ┌─────────────────────────────────────────────────────┐   │
│   │ Thawing and washing the frozen and stored fungus    │   │
│   │       mixture to obtain a fungus liquid (131)       │   │
│   └─────────────────────────────────────────────────────┘   │
│                            ▼                                │
│   ┌─────────────────────────────────────────────────────┐   │
│   │ Transferring the obtained fungus liquid to a        │   │
│   │              different container (132)              │   │
│   └─────────────────────────────────────────────────────┘   │
└─────────────────────────────────────────────────────────────┘
                             ▼
┌─────────────────────────────────────────────────────────────┐
│   Treating and/or formulating the fungus liquid to obtain   │─── 140
│             the mycoinsecticide composition                 │
│   ┌─────────────────────────────────────────────────────┐   │
│   │ Bubbling and stirring the fungus liquid in the      │   │
│   │                  container (141)                    │   │
│   └─────────────────────────────────────────────────────┘   │
│                            ▼                                │
│   ┌─────────────────────────────────────────────────────┐   │
│   │  Adding additional molasses to the fungus liquid    │   │
│   │                       (142)                         │   │
│   └─────────────────────────────────────────────────────┘   │
│                            ▼                                │
│   ┌─────────────────────────────────────────────────────┐   │
│   │     Adding fertilizer to the fungus liquid (143)    │   │
│   └─────────────────────────────────────────────────────┘   │
└─────────────────────────────────────────────────────────────┘
                             ▼
┌─────────────────────────────────────────────────────────────┐
│         Packaging the mycoinsecticide composition           │─── 150
└─────────────────────────────────────────────────────────────┘
```

FIG. 1

```
200 ─┐
     │
┌─────────────────────────────────────────────────────────────┐
│ Adding about 2.5 lbs of a cereal grain comprising rice and  │─201
│ barley and water to a mushroom bag                          │
└─────────────────────────────────────────────────────────────┘
                              │
                              ▼
┌─────────────────────────────────────────────────────────────┐
│ Adding B. bassiana fungus of the strain JTDRL-RC5A-HSSE     │─202
│ deposited under NRRL Number 67768 and molasses to the vessel│
│ to produce a fungus mixture                                 │
└─────────────────────────────────────────────────────────────┘
                              │
                              ▼
┌─────────────────────────────────────────────────────────────┐
│ Sealing the mushroom bag                                    │─203
└─────────────────────────────────────────────────────────────┘
                              │
                              ▼
┌─────────────────────────────────────────────────────────────┐
│ Storing the sealed mushroom bag to allow the fungus mixture │─204
│ to grow                                                     │
└─────────────────────────────────────────────────────────────┘
                              │
                              ▼
┌─────────────────────────────────────────────────────────────┐
│ Rolling, freezing, and storing the mushroom bag             │─205
└─────────────────────────────────────────────────────────────┘
                              │
                              ▼
┌─────────────────────────────────────────────────────────────┐
│ Thawing and washing the fungus mixture to obtain a fungus   │─206
│ liquid                                                      │
└─────────────────────────────────────────────────────────────┘
                              │
                              ▼
┌─────────────────────────────────────────────────────────────┐
│ Straining the fungus liquid and storing the strained fungus │─207
│ liquid in a container                                       │
└─────────────────────────────────────────────────────────────┘
                              │
                              ▼
┌─────────────────────────────────────────────────────────────┐
│ Adding additional molasses to the fungus liquid             │─208
└─────────────────────────────────────────────────────────────┘
                              │
                              ▼
┌─────────────────────────────────────────────────────────────┐
│ Adding a fertilizer to the fungus liquid                    │─209
└─────────────────────────────────────────────────────────────┘
                              │
                              ▼
┌─────────────────────────────────────────────────────────────┐
│ Bubbling and stirring the fungus liquid in a hydration      │─210
│ process to obtain a mycoinsecticide composition             │
└─────────────────────────────────────────────────────────────┘
                              │
                              ▼
┌─────────────────────────────────────────────────────────────┐
│ Transferring the obtained mycoinsecticide composition to an │─211
│ applicator device                                           │
└─────────────────────────────────────────────────────────────┘
                              │
                              ▼
┌─────────────────────────────────────────────────────────────┐
│ Spraying the mycoinsecticide composition with the applicator│─212
│ device over an area to be treated                           │
└─────────────────────────────────────────────────────────────┘
```

FIG. 2

SEQUENCE LISTING

```
Sequence total quantity: 3
SEQ ID NO: 1            moltype = DNA  length = 344
FEATURE                 Location/Qualifiers
source                  1..344
                        mol_type = genomic DNA
                        organism = Beauveria bassiana
SEQUENCE: 1
ggtgctgctt tctggcagac catctctggc gagcacggcc tcgactccag cggtgtttac   60
aatggcactt ctgagcttca gctcgagcgc atgaatgtct acttcaacga ggtttgttgt  120
gccctcccaa cgcgttgctt gatttcgttg tggatactga ccgcgatttt ccataggcct  180
ccggcaacaa atatgtacct cgcgccgtcc tcgtcgatct tgagcccggt accatggatg  240
ctgtccgtgc cggtcccttc ggtcagctct tccgtcccga caacttcgtt ttcggtcagt  300
ccggtgccgg caacaactgg gccaagggtc actacactga gggt                   344

SEQ ID NO: 2            moltype = DNA  length = 585
FEATURE                 Location/Qualifiers
source                  1..585
```

-continued

```
                        mol_type = genomic DNA
                        organism = Beauveria bassiana
SEQUENCE: 2
tagcggagga aaagaaacca acagggattg ccccagtaac ggcgagtgaa gcggcaacag    60
ctcaaatttg aaatctggct ctcagggccc gagttgtaat ttgtagagga tgcttttggc   120
gaggtgcctt ccgagttccc tggaacggga cgccacagag ggtgagagcc ccgtatggtc   180
ggacaccgag cctctgtaaa gctccttcga cgagtcgagt agtttgggaa tgctgctcaa   240
aatgggaggt atatgtcttc taaagctaaa tattggccag agaccgatag cgcacaagta   300
gagtgatcga aagatgaaaa gcactttgaa aagagggtta aaaagtacgt gaaattgttg   360
aaagggaagc gcctatgacc agacttgcgc ccggtgaatc acccagcgtt ctcgctggtg   420
cactttgccg ggcacaggcc agcatcagtt cagcgcgggg gagaaaggct tcgggaatgt   480
ggctccctcg ggagtgttat agcccgctgc gtaatgccct gcgccggact gaggtacgcg   540
cattgcaagg atgctggcgt aatggtcatc agcgacccgt cttga                   585

SEQ ID NO: 3            moltype = DNA  length = 587
FEATURE                 Location/Qualifiers
source                  1..587
                        mol_type = genomic DNA
                        organism = Beauveria bassiana
SEQUENCE: 3
tggaagtaaa aagtcgtaac aaggtctccg ttggtgaacc agcggaggga tcattaccga    60
gttttcaact ccctaaccct tctgtgaacc tacctatcgt tgcttcggcg gactcgcccc   120
agcccggacg cggactggac cagcggcccg ccggggacct caaactcttg tattccagca   180
tcttctgaat acgccgcaag gcaaaacaaa tgaatcaaaa ctttcaacaa cggatctctt   240
ggctctggca tcgatgaaga acgcagcgaa atgcgataag taatgtgaat tgcagaatcc   300
agtgaatcat cgaatctttg aacgcacatt gcgcccgcca gcattctggc gggcatgcct   360
gttcgagcgt catttcaacc ctcgacctcc cctgggggag gtcggcgttg gggaccggca   420
gcacaccgcc ggcctgaaa tggagtggcg gcccgtccgc ggcgacctct gcgtagtaat    480
acagctcgca ccggaacccc gacgcggcca cgccgtaaaa cacccaactt ctgaacgttg   540
acctcgaatc aggtaggact acccgctgaa cttaagcata tcaataa                 587
```

BIOLOGICAL PESTICIDE FUNGUS EFFECTIVE AGAINST MULTIPLE DIFFERENT SPECIES OF INSECT

CROSS-REFERENCE TO RELATED APPLICATION(S)

This application is a continuation of International Patent Application No PCT/US2021/053795, filed Oct. 6, 2021, titled BIOLOGICAL PESTICIDE FUNGUS EFFECTIVE AGAINST MULTIPLE DIFFERENT SPECIES OF INSECT, which claims priority to U.S. Provisional Patent Application No. 63/087,922, filed Oct. 6, 2020, titled BIOLOGICAL PESTICIDE FUNGUS EFFECTIVE AGAINST MULTIPLE DIFFERENT SPECIES OF INSECT, the disclosures of which are hereby incorporated by reference in their entireties.

REFERENCE TO A SEQUENCE LISTING

The instant application contains a Sequence Listing in electronic format entitled "18745_0001USCI_SL.xml" which was created Nov. 15, 2022 and which has a size of 5,225 bytes. The contents of the XML file "Sequence-Listing-18745-0001USCI.xml" are incorporated by reference herein.

BACKGROUND

Insects can have negative impacts on many plants. When left unchecked, particular species of insects can have devastating effects on large populations of plants. As just one example, pine borer beetles have killed millions of trees in North America. In California alone, it is estimated that 147 million trees died between 2010 and 2018. Pine borer beetles kill more healthy adult pine trees in British Columbia than logging and wildfires combined.

Existing treatments of such invasive insects include mycoinsecticides that utilize *Beauveria bassiana* fungus. However, these treatment compositions are intended for use on a small scale. What is needed is an effective large-scale solution to combat widespread insect infestations.

SUMMARY

In general terms, the present disclosure relates to compositions, method of making and using the same, for treating plants infested with harmful insects.

In one aspect, the present disclosure provides a method for producing a mycoinsecticide composition. In one example, the method comprises: preparing a starter culture to grow a strain of *Beauveria bassiana* fungus: freezing and storing the prepared starter culture to obtain a fungus mixture: treating the stored fungus mixture to obtain a fungus liquid containing the grown *Beauveria bassiana* fungus: treating and/or formulating the fungus liquid to obtain the mycoinsecticide composition; and packaging the mycoinsecticide composition.

In some embodiments, preparing a starter culture further comprises: adding water to a cereal grain in a vessel and allowing the water to soak the cereal grain; adding the *Beauveria bassiana* fungus and a glucose source to produce a fungus mixture having a glucose content of about 4 to about 6%, based on total weight of the fungus mixture; and allowing the fungus mixture to grow in the vessel for about 10 to about 30 days at a temperature of about 70 to about 80° F.

In some embodiments, the fungus mixture is frozen and stored at a temperature of about −22 to about 0° F.

In some embodiments, treating the stored fungus mixture further comprises: thawing and washing the fungus mixture with a water-based liquid to obtain a fungus liquid; and straining the fungus liquid and storing the fungus liquid in a container.

In some embodiments, treating and/or formulating the fungus liquid further comprises: adding a glucose source to raise the total glucose content of the fungus liquid to about 6 to about 8% based on total weight of the fungus liquid: adding a fertilizer to the fungus liquid; and bubbling and stirring the fungus liquid in the container for about 10 to about 60 days.

In some embodiments, the glucose source is molasses.

In some embodiments, the *Beauveria bassiana* fungus is of the strain JTDRL-RC5A-HSSE deposited under NRRL Number 67768.

In some embodiments, the cereal grain comprises rice and barley.

In another aspect, the present disclosure provides a mycoinsecticide composition. The mycoinsecticide composition comprises *Beauveria bassiana* fungus of the strain JTDRL-RC5A-HSSE deposited under NRRL Number 67768. In some embodiments, the mycoinsecticide composition is product made by the methods described herein.

In a further aspect, the present disclosure provides a method of treating plants to prevent damage from insects. In one example, the method comprises: preparing the mycoinsecticide composition described herein; and applying the mycoinsecticide composition to the plants by spraying.

The plants may be trees including pine trees, or bushes including coffee plants. The insects may be borer beetles including coffee borer beetles or pine borer beetles.

BRIEF DESCRIPTION OF THE DRAWINGS

FIG. 1 illustrates a flow diagram of one particular example method 100 for making a mycoinsecticide composition, in accordance with various embodiments of the present disclosure.

FIG. 2 illustrates a flow diagram of one particular example method 200 for insect control, in accordance with various embodiments of the present disclosure.

DETAILED DESCRIPTION

Herein is provided a novel fungal biocontrol agent that is pathogenic to multiple species of invasive insects. The present disclosure is directed to compositions and methods for treating plants infested with harmful insects. Unique compositions include a particular strain of *Beauveria bassiana*. The live fungus is pathogenic to various species of insects, causing white muscardine disease. When spores of this fungus come in contact with the cuticle (skin) of susceptible insects, they germinate and grow directly through the cuticle to the inner body of their host. The compositions are sprayed over affected areas and the fungus attaches to the insects. As spores germinate and mycelium filaments grow, the fungus penetrates through layers of the cuticle of the target insect. In some instances, the insects ingest the fungus, allowing it to kill the host from within.

Targeted Insects and Affected Plants

The methods and compositions described herein can be applied to a multitude of harmful insects. Some key targets include coffee berry borer, pine borer, locust, and sweet-potato bug.

Coffee Berry Borer Coffee berry borers, also known as coffee borer beetles (*Hypothenemus hampei*) are insects that infest and feed upon coffee plants. In particular, these small black beetles invade the coffee berry. These beetles originated in Africa, but have spread to all countries where coffee crops are grown, making them one of the top most harmful pests of coffee plants. Traditional pesticides are largely unsuccessful in controlling coffee berry borers because they are only effective before the insects bore into the coffee berries.

Pine Borer Beetles/Bark Beetles

There are over 2,000 species of bark beetles, 600 of which can be found in the United States. Bark beetles are tiny insects with hard, cylindrical bodies that reproduce under the bark of trees. Roots, stems, seeds, and fruits of the trees can be damaged by the beetles. The mountain pine beetle (*Dendroctonus ponderosae*), southern pine beetle (*Dendroctonus frontalis*), and their near relatives are major pests of conifer forests in North America. A similarly aggressive species in Europe is the spruce bark beetle (*Ips typographus*). This has caused widespread damage to forests. This, in turn, has created major fire hazards.

Locusts

Plagues of locusts have been terrorizing East Africa in 2020. The devastating effects of the swarms not only wipe out acres of plants, but also take away key sources of food for livestock and humans. Farmers have tried battling the plagues with chemical pesticides, but those cause environmental and health concerns.

Desert locusts, or *Schistocerca gregaria*, have often been called the world's most devastating pest for good reason. Swarms form when locusts' numbers increase and they become crowded. This causes a switch from a relatively harmless solitary phase, to a gregarious, sociable phase. In this phase, the insects are able to multiply 20-fold in three months and reach densities of 80 million per square kilometer. Each can consume 2 g of vegetation every day—combined, a swarm of 80 million can consume food equivalent to that eaten by 35,000 people a day.

Sweetpotato Bug

The sweetpotato bug (*Physomerus grossipes*) is a sucking insect. They pierce the plants they feed on with their mouths and suck out the sap. While small numbers of the bugs will not cause a lot of damage, large infestations can cause yellowing and wilting in plants, making them more susceptible to other pests and diseases. The sweetpotato bug is a relatively new arrival to the islands of Hawaii. These bugs are fairly resistant to chemical sprays, making them an ideal target for biological controls. Initial testing has shown that *Beauveria bassiana* is effective at eradicating these bugs.

The following table (Table 1) provides an exemplary list of additional insect species and associated target tree species.

TABLE 1

| Species | Trees affected | Generations per year | Comments |
| --- | --- | --- | --- |
| Cedar and cypress bark beetles (*Phloeosinus* species) | arborvitae, cypress, false cypress (*Chamaecyparis*), junipers, and redwood | 1 to 2 | tunnels resemble centipede on wood surface and the inner bark; adults feed on and kill twigs; egg-laying female attracted to trunk of dead or dying trees |
| Elm bark beetles (*Scolytus multistriatus*, *Scolytus schevyrewi*) | elms | 2 | over winter as fully grown larvae in bark; shot holes in bark indicate damage; lay eggs in limbs and trunk of injured, weakened, or recently cut elms; spread Dutch elm disease fungi |
| Engraver beetles (*Ips emarginatus*, *Ips mexicanus*, *Ips paraconfusus*, *Ips pini*, *Ips plastographus*) | pines | 1 to 5 | overwinter as adults; often make wishbone-shaped tunnels; attack pines near the top of the stem |
| Fir engraver (*Scolytus ventralis*) | white and red fir | 1 to 2 | overwinter as larvae; adults excavate deep and long, two-armed galleries across the grain of the sapwood |
| Jeffrey pine beetle (*Dendroctonus jeffreyi*) | Jeffrey pine | 1 to 2 | attack midtrunk of large trees, from 5 to about 30 ft; make long J-shaped galleries, overwinter as larvae in the inner bark |
| Mediterranean pine engraver (*Orthotomicus* [formerly *Ips*] *erosus*) | pine | 3 to 4 | infest trunk and large limbs of Mediterranean pines, especially Aleppo pine (*Pinus halepensis*) and |

TABLE 1-continued

| Species | Trees affected | Generations per year | Comments |
| --- | --- | --- | --- |
| Mountain pine beetle (*Dendroctonus ponderosae*) | pine, frequently on lodgepole and sugar pine | 1 to 2 | Italian stone pine (*Pinus pinea*) attack midtrunk of large trees, from 5 to about 30 ft; makes long J-shaped galleries, overwinter as larvae in the inner bark |
| Oak ambrosia beetles (*Monarthrum species*); Oak bark beetles (*Pseudopityophthorus species*) | buckeye, oaks, and tanbark oak | 2 or more | overwinter beneath bark; bleeding, frothy, bubbling holes with boring dust indicate damage; attack stressed trees |
| Redhaired pine bark beetle (*Hylurgus ligniperda*)[1] | pine | 2 to 3 | believed to prefer roots and lower trunk of declining Aleppo pine and Canary Island pine (*Pinus canariensis*) |
| Red turpentine beetle (*Dendroctonus valens*) | pines, rarely in larch, spruce, or white fir | 0.5 to 2 | attack lowest 2 to 8 ft. of trunk and the large roots; pitch tubes appear on bark; overwinter as adults and larvae; rarely kill trees |
| Shothole borer (*Scolytus rugulosus*) | English laurel, fruit trees, hawthorn, and other woody plants | 2 or more | infestation indicated by gumming of woody parts, appearance of boring dust, or twig dieback; remove and destroy infested parts |
| Twig beetles (*Pityophthorus carmeli, Pityophthorus juglandis, Pityophthorus nitidulus, Pityophthorus setosus*) | pine, walnut | 2 or more | attack lateral shoots and twigs, can mine the pith; pine species are associated with pitch canker disease transmission; on walnut *Pityophthorus juglandis* is associated with thousand cankers disease transmission |
| Western pine beetle (*Dendroctonus brevicomis*) Spruce Beetles | Coulter and ponderosa pines Engelmann, white, Sitka and, rarely, black spruce. | 2 to 4 | attack midtrunk, then spread up and down; larvae feed on inner bark, complete development in outer bark; attack in conjunction with other pests |
| Douglas-fir beetle (*Dendroctonus pseudotsugae*) Ips beetle, *Ips* spp. | Douglas-fir and occasionally downed western larch. The most critical attacks occur in white and Engelmann spruce, and lodgepole and ponderosa pine. | | |
| Lodgepole pine beetle (*Dendroctonus murryanae*) | Lodgepole Pine | | |
| Western balsam bark beetle (*Dryocoetes confuses*) | Primarily sub-alpine fir, but occasionally amabilis fir. Some attacks of white spruce and Engelmann spruce have been recorded. | | |

Other insects that are harmful to plants include borer beetles and weevils such as: Ash bark beetles (*Hylesinus* species), *Ambrosia* beetles (*Xyleborinus saxesenii*), Hemp Weevil (*Rhinoncus pericarpius*), Stalk borers (*Papaipema nebr*), Hemp borers (*Grapholita delineana*), European corn borers (ECBs), (*Ostrinia nubilalis*), and Hemp Flea Beetles (Psylliodes attenuate). Yet other examples of potential insect targets include, but are not limited to: Aphids, Barnacles/Scale Insects, Broad Mites & Russet Mites, Caterpillars & Inchworms, Crickets, Fungus Gnats, Grasshoppers, Leafhoppers, Leaf Miners, Mealybugs, Slugs/Snails, Spider Mites, Thrips, and Whiteflies. All of the insects described here may be targeted with the biological control agents described herein. In some embodiments, additional insects could be targeted by these mycoinsecticides.

Mycoinsecticide Composition

Compositions of the present disclosure include *Beauveria bassiana* fungus selected from 31 possible strains. Some are more effective for use as biopesticides than others. In some embodiments, the fungus is the strain JTDRL-RC5A-HSSE. The fungus included in the composition is both in the form of spores and mycelia. By including two forms of the fungus, chances are increased that the fungus will grow and spread once it is applied. One benefit of including mycelia (instead of spores alone) is that the fungus will visibly spread sooner, indicating that an effective amount has been applied.

Diatomaceous earth and fertilizer can also be included for compositions that will be applied directly to plants. These ingredients boost efficacy of the biopesticide and also provide plants with other beneficial properties to enhance growth and vitality of the plants.

The preferred strain of *Beauveria bassiana* used for biocontrol is strain JTDRL-RC5A-HSSE. A deposit of this strain has been made to the Agricultural Research Culture Collection International Depository Authority, 1815 North University Street, Peoria, Illinois 61604 U.S.A., with NRRL Number 67768, under the terms of the Budapest Treaty on the International Recognition of the Deposit of Microorganisms for the Purposes of Patent Procedure. Subject to 37 CFR § 1.808 (b), all restrictions imposed by the depositor on the availability to the public of the deposited material will be irrevocably removed upon the granting of any patent from this patent application.

β-tubulin DNA sequence of JTDRL-RC5A-HSSE is set forth in SEQ ID NO 1.

D1/D2 DNA sequence of JTDRL-RC5A-HSSE is set forth in SEQ ID NO 2.

ITS region DNA sequence of JTDRL-RC5A-HSSE is set forth in SEQ ID NO 3.

Method of Making

In some aspects, the present disclosure provides a method for making a mycoinsecticide composition. FIG. 1 shows a flow diagram of one particular example method 100. In the illustrated example, a method 100 includes at least one of operations 110, 120, 130, 140, 150, or any combination thereof. Operation 110 includes preparing a starter culture to grow a strain of *Beauveria bassiana* fungus. Operation 120 includes freezing and storing the prepared starter culture for a period of time to obtain a fungus mixture. Operation 130 includes treating the stored fungus mixture to obtain a fungus liquid containing the grown *Beauveria bassiana* fungus. Operation 140 includes treating and/or formulating the fungus liquid to obtain the mycoinsecticide composition. Operation 150 includes packaging the mycoinsecticide composition.

At 110, a starter culture is prepared and the *Beauveria bassiana* fungus is first grown from the starter culture. Operation 110 may further include operations 111, 112, 113, and 114. Operation 111 includes mixing water and a cereal grain in a vessel. Operation 112 includes adding a strain of *Beauveria bassiana* fungus and molasses in the vessel to produce a fungus mixture. Operation 113 includes sealing the vessel. Operation 114 includes allowing the fungus mixture to grow in the vessel at a first temperature for a first period of time.

At 111, a vessel is filled with water and a cereal grain, and the cereal grain is soaked in the water for a period of time.

In some embodiments, the cereal grain is selected from one or more of rice, barley, corn, wheat, sorghum, millet, oats, rye, and fonio. In some embodiments, the cereal grain includes rice. In some embodiments, barley is added with rice. In some embodiments, the cereal grain is soaked in water for at least about 0.5 hour, or at least about 1 hour, at least about 2 hours, at least about 3 hours, at least about 4 hours, at least about 5 hours, or at least about 10 hours. In some embodiments, the cereal grain is soaked in water for about 1 to about 10 hours, or from about 2 to about 6 hours, or from about 2 to about 4 hours. In some embodiments, the fungus is grown in a vessel that holds 5 lbs of dry weight substrate which is then soaked in water for approximately two hours prior to inoculating the substrate.

In some embodiments, the vessel is selected from one or more of a bucket, a tank, a bag and a tub. In some embodiments, a mushroom bag is used and is laid flat during the growing process. In some embodiments, the vessel can hold at least one gallon of liquid contents. In some embodiments, the vessel can hold at least two gallons, at least three gallons, at least 5 gallons, or at least 10 gallons of contents. In embodiments where a larger vessel is used to make larger batches, the size of the vessel is selected in proportion to the number of pounds of grain used.

At 112, the water-saturated cereal grain is inoculated with the *Beauveria bassiana* fungus that is added to the vessel. A preferred strain of *Beauveria bassiana* fungus is strain JTDRL-RC5A-HSSE according to the present disclosure. A source of glucose is also added to the vessel at 112 along with the fungus to encourage growth of the fungus.

In some embodiments, the source of glucose is selected from one or more of molasses, brown sugar, and syrup. In some embodiments, the glucose is included in an amount of at least 2% of the total volume of the vessel. In some embodiments, the glucose is included in an amount of at least 3% or at least 4%. In some embodiments, the glucose is included in an amount of less than 7% of the total volume of the vessel. In some embodiments, the glucose content is from 2 to 7% of the total volume. In some embodiments, the glucose content is from 4 to 6% of the total volume.

At 113, the vessel is sealed. In some embodiments, the vessel is a mushroom bag. The mushroom bag is inoculated with the fungus through a valve that is then sealed for the growing process.

At 114, the *Beauveria bassiana* fungus mixture is allowed to grow in the sealed vessel at a controlled temperature. In some embodiments, the *Beauveria bassiana* fungus is grown in the vessel at a temperature within the range of about 60 to about 90° F. In some embodiments, the temperature is within the range of about 70 to about 80° F. In some embodiments, the temperature for growth is about 78° F.

In some embodiments, the fungus mixture is allowed to grow for at least about 10 days. In some embodiments, the fungus mixture is allowed to grow for at least about 14 days. In some embodiments, the fungus mixture is allowed to grow for at least about 20 days. In some embodiments, the fungus mixture is allowed to grow for about 30 days or less. In some embodiments, the fungus mixture is allowed to grow for about 14 to about 21 days. In some embodiments, the fungus mixture is allowed to grow for about 20 to about 30 days. In some embodiments, the fungus mixture is allowed to grow for about 18 to about 24 days.

At 120, the sealed vessel containing the fungus mixture is frozen at a second temperature and stored for a second period time. In some embodiments, the fungus mixture can be frozen and stored for up to five years. In embodiments where the fungus is grown in a bag, the bag can be rolled up and placed in a freezer for storage. The fungus mixture can also be transported in a frozen state. In some embodiments, the fungus mixture is frozen to a temperature of less than about 0° F. In some embodiments, the fungus mixture is frozen to a temperature of less than about −5° F. In some embodiments, the fungus mixture is frozen to a temperature of less than about −10° F. In some embodiments, the fungus mixture is frozen to a temperature of about −20 to about (°) F. In some embodiments, the fungus mixture is frozen to a temperature of about −15 to about −10° F. In some embodiments, the fungus mixture is frozen to a temperature of about −12° F.

Once the frozen fungus mixture has arrived at its destination, the frozen fungus mixture is treated to obtain a fungus liquid at 130. Operation 130 may further include operations 131 and 132. At 131, the frozen and stored fungus mixture is thawed and washed with a water-based liquid and the fungus is washed off of the fungus mixture and to obtain a fungus liquid. The resulting fungus liquid containing the fungus is transferred to a new container at 132 and stored therein. In some embodiments, some of the mixture is returned to the original vessel to inoculate a new batch of fungus-containing mixture. In some embodiments, the container holds at least about 5 gallons. In some embodiments, the new container holds at least about 20 gallons. In some embodiments, the new container holds at least about 50 gallons. In some embodiments, the new container holds a volume of from about 5 to about 55 gallons.

In some embodiments, the water-based liquid used to wash the cereal grain contains a minimum amount of chlorine. The chlorine content may be beneficial for minimizing contaminants in the mixture. In some embodiments, the mixture is strained as it is transferred to the new container.

Once the fungus liquid is transferred into the new container, the fungus liquid may be further treated and/or formulated at 140 to obtain the mycoinsecticide composition. Operation 140 may further include at least one of operations 141, 142, 143, or combinations thereof. At 141, the fungus liquid in the container is bubbled with a gas such as ambient air and stirred in a process referred to a hydration. Bubbling provides oxygen to the fungus liquid. At 142, a fertilizer mixture is added to the liquid fungus composition. In some embodiments, the fertilizer mixture includes diatomaceous earth. In some embodiments, the composition is free or substantially free from surfactants. At 143, the glucose content of the fungus liquid is raised by adding more of a glucose source such as molasses to the fungus liquid. In some embodiments, the glucose content of the fungus liquid is raised to about 6 to about 8%. In some embodiments, the glucose content of the fungus liquid is raised to about 7%. Other additives and functional ingredients common to the insecticide industry may be added to the fungus liquid at 140. In some embodiments, the mycoinsecticide composition is free or substantially free from a synthetic biocide.

In some embodiments, the hydration process at 141 takes at least about two weeks. In some embodiments, the hydration process takes at least about three weeks. In some embodiments, the hydration process takes from about 15 to about 30 days.

The obtained mycoinsecticide composition may be packaged at operation 150. In one embodiment, the mycoinsecticide composition is transferred to an applicator device.

The resulting mycoinsecticide composition can be applied to the area to be treated. In some embodiments, a portion of the mycoinsecticide composition can remain in the container and continues to grow in a "regrowth process." In some embodiments, this regrowth process can be repeated up to five times. In some embodiments, the regrowth process is repeated three to four times.

Method of Application

In some aspects, the present disclosure relates to a method of insect control, the method comprising applying a mycoinsecticide composition described herein to the area to be treated.

The liquid mycoinsecticide compositions according to the present disclosure can be applied in multiple ways with different types of applicator devices. These may include, among others: 1) small applications with backpack sprayers, 2) larger mechanical spray equipment, 3) large tank spraying equipment, 4) large capacity tractor application, 5) drone application, 6) helicopter application, and 7) aircraft tanker application. In some embodiments, the applicator device is selected from a backpacker sprayer, a spot sprayer, an ATV sprayer, a UTV sprayer, a tow behind sprayer, a truck bed sprayer, a 3 point hitch sprayer, a boom sprayer, and a mist sprayer. In some embodiments, the applicator device is attached to at least one of an airplane, a jet aircraft, a helicopter, and an unmanned aerial vehicle.

In some embodiments, the process of preparing the present mycoinsecticide composition and applying the mycoinsecticide composition is performed by a trained individual. In some embodiments, each batch of the liquid composition can treat at least one acre of land. In some embodiments, the liquid composition can be applied to thousands of acres at a time to combat widespread infestations.

FIG. 2 illustrates a flow diagram of one particular example method 200 for insect control. In the illustrated example, the method 200 includes operations 201, 202, 203, 204, 205, 206, 207, 208, 209, 210, 211, and 212. At 201, about 2.5 lbs of a cereal grain comprising rice and barley are mixed with water in a mushroom bag to allow the water to soak the cereal grain for about 2 to about 4 hours. At 202, *Beauveria bassiana* fungus of the strain JTDRL-RC5A-HSSE deposited under NRRL Number 67768 and molasses are added to the vessel to produce a fungus mixture. The amount of molasses is adjusted such that the fungus mixture has a glucose content of about 5%. At 203, the mushroom bag is sealed. At 204, the sealed mushroom bag was stored at a temperature of about 78° F. for about 14 to about 21 days to allow the fungus to grow. At 205, the mushroom bag is rolled and stored at a temperature of about −12° F. for a period of time up to about 5 years. At 206, the fungus mixture is thawed and washed with a water-based liquid containing chlorine to obtain a fungus liquid. At 207, the fungus liquid is strained and stored in a container. At 208, additional molasses is added to the fungus liquid to adjust the glucose content of the fungus liquid to about 7%. At 209, a fertilizer is added to the fungus liquid. At 210, the fungus liquid is bubbled and stirred for about 20 to about 30 days at a temperature of about 78° F. to obtain a mycoinsecticide composition. At 211, the mycoinsecticide composition is transferred from the container to an applicator device. At 212, the mycoinsecticide composition is sprayed over an area to be treated, wherein the area to be treated includes plants damaged by insects or susceptible to damage from insects.

As used herein, "weight percent," "wt %, "percent by weight." "% by weight," and variations thereof refer to the concentration of a substance as the weight of that substance divided by the total weight of the composition and multiplied by 100. It is understood that, as used here, "percent," "%," and the like are intended to be synonymous with "weight percent." "wt %," etc.

The term "about" is used in conjunction with numeric values to include normal variations in measurements as expected by persons skilled in the art, and is understood to have the same meaning as "approximately" and to cover a typical margin of error, such as ±15%, ±10%, ±5%, ±1%, ±0.5%, or even ±0.1% of the stated value. The term "about" also encompasses amounts that differ due to different equilibrium conditions for a composition resulting from a particular initial composition. Whether or not modified by the term "about," the claims include equivalents to the quantities.

It should be noted that, as used in this specification and the appended claims, the singular forms "a," "an," and "the" include plural referents unless the content clearly dictates otherwise. Thus, for example, reference to a composition containing "a compound" includes having two or more compounds that are either the same or different from each other. It should also be noted that the term "or" is generally employed in its sense including "and/or" unless the content clearly dictates otherwise. As used herein, "and/or" refers to and encompasses any and all possible combinations of one or more of the associated listed items, as well as the lack of combinations when interpreted in the alternative ("or").

In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

The term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

The term "substantially free" may refer to any component that the composition of the disclosure lacks or mostly lacks. When referring to "substantially free" it is intended that the component is not intentionally added to compositions of the disclosure. Use of the term "substantially free" of a component allows for trace amounts of that component to be included in compositions of the disclosure because they are present in another component. However, it is recognized that only trace or de minimus amounts of a component will be allowed when the composition is said to be "substantially free" of that component. Moreover, if a composition is said to be "substantially free" of a component, if the component is present in trace or de minimus amounts it is understood that it will not affect the effectiveness of the composition. It is understood that if an ingredient is not expressly included herein or its possible inclusion is not stated herein, the disclosure composition may be substantially free of that ingredient. Likewise, the express inclusion of an ingredient allows for its express exclusion thereby allowing a composition to be substantially free of that expressly stated ingredient.

The term "comprise," "comprises," and "comprising" as used herein, specify the presence of the stated features, integers, steps, operations, elements, and/or components, but do not preclude the presence or addition of one or more other features, integers, steps, operations, elements, components, and/or groups thereof.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same functions and/or results described therein and which are included within the scope of the present disclosure.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method of insect control, the method comprising:
adding water to about 2.5 pounds of rice with barley in a mushroom bag and allowing the water to soak the rice and barley for about 2 to about 4 hours;
adding *Beauveria bassiana* fungus of the strain JTDRL-RC5A-HSSE deposited under NRRL Number 67768 and molasses to produce a fungus mixture having a glucose content of about 5%;
sealing the mushroom bag;
allowing the fungus mixture to grow in the mushroom bag for about 14 to about 21 days at a temperature of about 78° F.;
rolling the mushroom bag and storing at a temperature of about −12° F. for up to about 5 years;
thawing and washing the fungus mixture with water containing chlorine to obtain a fungus liquid;
straining the fungus liquid and storing the fungus liquid in a container;
adding additional molasses to the fungus liquid to bring the total glucose content to about 7%;
adding fertilizer to the fungus liquid;
bubbling and stirring the fungus liquid in the container for about 20 to about 30 days at a temperature of about 78° F. to obtain a mycoinsecticide composition;
transferring the mycoinsecticide composition to an applicator device; and
spraying the mycoinsecticide composition with the applicator device over an area to be treated,
wherein the area to be treated includes plants susceptible to damage from insects.

2. The method of claim 1, wherein the applicator device is selected from at least one of a backpacker sprayer, a spot sprayer, an ATV sprayer, a UTV sprayer, a tow behind sprayer, a truck bed sprayer, a 3 point hitch sprayer, a boom sprayer, and a mist sprayer.

3. The method of claim 1, wherein the applicator device is attached to at least one of an airplane, a jet aircraft, a helicopter, and an unmanned aerial vehicle.

4. The method of claim 1, wherein the plants include one or more species of shrubs and trees.

5. The method of claim 1, wherein the insects are boring insects.

6. A method of treating plants to prevent damage from insects, the method comprising:
preparing a mycoinsecticide composition by:
preparing a starter culture to grow a strain of *Beauveria bassiana* fungus by:
adding water to a cereal grain in a vessel and allowing the water to soak the cereal grain;
adding the *Beauveria bassiana* fungus of the strain JTDRL-RC5A-HSSE deposited under NRRL Number 67768 and a glucose source to produce a fungus mixture having a glucose content of about 4% to about 6%, based on total weight of the fungus mixture; and
freezing and storing the prepared starter culture to obtain a fungus mixture;
treating the stored fungus mixture to obtain a fungus liquid containing the grown *Beauveria bassiana* fungus;
treating and/or formulating the fungus liquid to obtain the mycoinsecticide composition; and
packaging the mycoinsecticide composition; and
applying the mycoinsecticide composition to the plants by spraying.

7. The method of claim 6, wherein the plants are trees.

8. The method of claim 6, wherein the plants are bushes.

9. The method of claim 7, wherein the trees are pine trees.

10. The method of claim 8, wherein the bushes are coffee plants.

11. The method of claim 6, wherein the insects are borer beetles.

12. The method of claim 11, wherein the borer beetles are coffee borer beetles.

13. The method of claim 11, wherein the borer beetles are pine borer beetles.

14. The method of claim 6, wherein the insects are weevils.

15. The method of claim 6, wherein the fungus mixture is allowed to grow in the vessel for about 10 to about 30 days.

16. The method of claim 6, wherein the fungus mixture is allowed to grow in the vessel at a temperature of about 70° F. to about 80° F.

17. The method of claim 6, wherein the fungus mixture is frozen and stored at a temperature of about −22° F. to about 0° F.

18. The method of claim 6, wherein treating the stored fungus mixture further comprises:
   thawing and washing the fungus mixture with a water-based liquid to obtain a fungus liquid; and
   straining the fungus liquid and storing the fungus liquid in a container.

19. The method of claim 6, wherein treating and/or formulating the fungus liquid further comprises:
   adding a glucose source to raise the total glucose content of the fungus liquid to about 6 to about 8% based on total weight of the fungus liquid; and
   adding a fertilizer to the fungus liquid; and bubbling and stirring the fungus liquid in the container for about 10 to about 60 days.

* * * * *